United States Patent [19]
Johnson

[11] 3,807,896
[45] Apr. 30, 1974

[54] CONCENTRIC TUBE SPRING ROTOR MOUNT

[75] Inventor: Glenn E. Johnson, Fort Worth, Tex.

[73] Assignee: Textron Incorporated, Providence, R.I.

[22] Filed: Oct. 10, 1972

[21] Appl. No.: 295,885

[52] U.S. Cl............... 416/102, 416/135, 416/148, 416/134
[51] Int. Cl............................................. B64c 27/52
[58] Field of Search............ 416/122, 148, 134–136, 416/141, 102

[56] References Cited
UNITED STATES PATENTS

| | | | |
|---|---|---|---|
| 2,949,965 | 8/1960 | DeTore et al.................. | 416/102 X |
| 3,288,226 | 11/1966 | Lemont et al. ................ | 416/102 X |
| 3,292,712 | 12/1966 | Schmidt........................ | 416/134 X |
| 3,297,094 | 1/1967 | Kisovec......................... | 416/134 X |
| 3,556,673 | 1/1971 | Killian............................ | 416/134 |
| 3,652,185 | 3/1972 | Cresap et al.................. | 416/134 |

Primary Examiner—Everette A. Powell
Attorney, Agent, or Firm—Richards, Harris & Medlock

[57] ABSTRACT

The helicopter main rotor is mounted on a rotating support mast by feathering bearings and flapping bearings to provide pitch change control and to tilt the rotation plane of the rotor. Rotor tilting is provided by the flapping bearings coupling a blade yoke to the mast. The flapping bearings are elastomeric elements fitted onto pivot shafts on a trunnion mounted on the mast. These elastomeric elements also mount in bearing blocks bolted to the rotor yoke. To increase the control power about the pitch and roll axis of the aircraft, particularly at rotor loadings of less than one "G," a concentric tube torsion spring interconnects pivot shafts of the trunnion to respective bearing blocks. Each of the concentric tube torsion springs includes an inner tube mounted within an outer tube and joined together at the outboard ends. The inboard end of the inner tube connects to the pivot shaft and the inboard end of the outer tube connects to the bearing block.

9 Claims, 3 Drawing Figures

3,807,896

1

CONCENTRIC TUBE SPRING ROTOR MOUNT

This invention relates to a rotor mounting for a flapping main rotor, and more particularly to a rotor mounting for providing spring restraint to the motion of the rotor about the flapping axis.

Each of the rotor blades of the main rotor assembly of a helicopter is attached to a rotating hub by a system of hinges and bearings that allows each blade to be "feathered," or changed in pitch, to "flap" up and down and, in some designs, swing forward and backward to provide "lead-lag" control. These various interconnections for giving a rotor blade several degrees of freedom enables the blades to be adjusted to the varying loads encountered during rotation about a main support mast. Flapping hinges (sometimes known as teetering hinges) make it possible for the entire rotor to tilt so that direction of thrust is displaced from the helicopter's center of gravity, producing a moment, or turning force, that pitches or rolls the craft.

A feature of the present invention is to provide a control coupling between the rotor and the mast. Another feature of this invention is to provide a hub moment spring coupling between the main rotor and the mast to increase the control power about the pitch and roll axes of the aircraft for increased maneuver rate and center of gravity range.

In accordance with the present invention, a rotor blade mounting for a flapping main rotor includes a yoke having each of the rotor blades attached thereto and rotatable therewith. The yoke includes first and second bearing blocks positioned along the flapping axis. Attached to the mast is a trunnion having first and second pivot shafts extending from opposite ends thereof. Mounted to each of these pivot shafts is a flapping bearing mounted in bearing blocks of the yoke to provide flapping freedom to the rotor. A hub spring having one end secured to the trunnion and a second end secured to the yoke applies a control moment to the fuselage upon tilting of the rotor that is distinct from and in addition to the control moment produced by displacement of the thrust vector from the center of gravity of the helicopter.

In a more specific embodiment of the invention, the rotor mounting includes a yoke having first and second bearing blocks positioned along a flapping axis. Each of the rotor blades is mounted to the yoke by means of a blade grip through coupling bearings. A trunnion attached to a mast has first and second pivot shafts extending from opposite ends thereof. On each of the pivot shafts of the trunnion is mounted a bearing that is also mounted in a bearing block of the yoke. A concentric tube hub spring has two tube ends joined together. The second end of the inner tube is secured to the trunnion and the second end of the outer tube is secured to the yoke.

A more complete understanding of the invention and its advantages will be apparent from the specification and claims and from the accompanying drawings illustrative of the invention.

Referring to the drawings.

Figure 1:
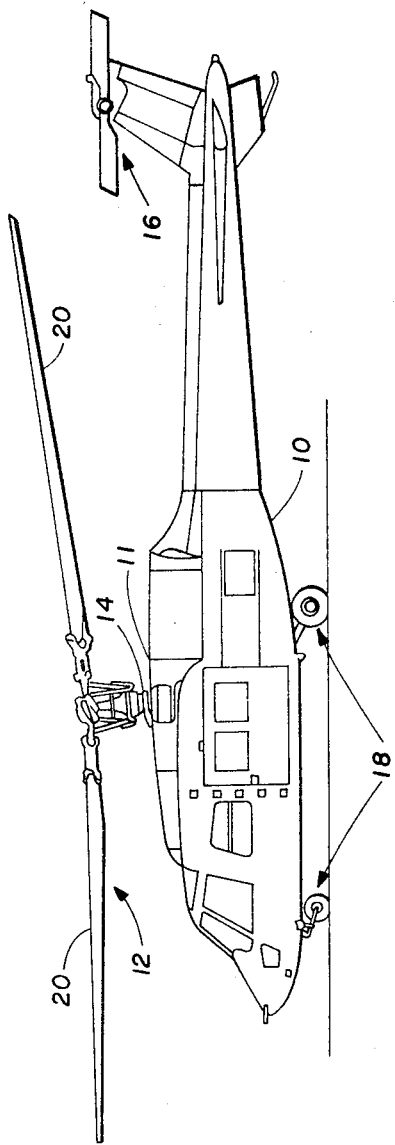
FIG. 1 is a pictorial view of a helicopter with a two blade flapping main rotor assembly and a tail rotor assembly.

Referring to FIG. 1, the helicopter shown comprises an elongated fuselage or hull 10 having a pylon 11 housing an engine and the associated gearing required to rotate a lifting main rotor assembly 12 about a vertical shaft or rotating support mast 14. The tail portion includes an anti-torque tail rotor assembly 16, as required on single main rotor helicopter designs, to provide in-flight stability and aircraft heading control, that is, control in yaw. A landing gear 18 is provided for supporting the helicopter.

Angular motions to which a helicopter is subject are pitch, roll and yaw, as in fixed wing aircraft. To control a helicopter's flight path, a pilot operates a "collective-pitch control" stick to impart varying degrees of pitch to each rotor blade 20 of the main rotor assembly 12. By operating the collective-pitch control stick to increase or decrease the "bite" of all of the rotor blades as a unit, a change in thrust is produced that causes the helicopter to ascend or to descend. A pilot's operation of a "cyclic-pitch control" stick causes variations of the bite of the blades at different points in their cycle of rotation and, through gyroscopic precession of the rotating blades, is thus able to tilt the plane of rotation of the main rotor assembly to produce a pitching or rolling maneuver.

To enable the pilot to change the bite of each blade and thereby vary the plane of rotation of the main rotor assembly 12, each blade is equipped with a feathering hinge. These hinges provide the mechanism for enabling the rotor assembly to tilt about a flapping axis so that the direction of thrust is displaced from the helicopter center of gravity, thereby producing the "moment" or turning force, that pitches or rolls the craft.

To provide more responsive and effective control in pitch and roll, the present invention contemplates coupling the main rotor assembly to a rotating support mast by a hub moment spring. Similar to the control moment provided by displacment of the thrus vector, this hub moment spring provides a control moment in this case by providing a force between the rotor and the mast that tends to cause the mast (and the fuselage) to "follow" the tilt of the rotor.

Basically, a rotor blade 20 of the assembly 12 is mounted to a yoke by means of a blade grip wherein the yoke and blade grip are interconnected by means of elastomeric path change bearings arranged along the longitudinal axis of the blade grip. These elastomeric couplings enable the individual rotor blades to be adjusted in pitch to vary the "bite" of the blade as it rotates about the vertical shaft or support mast 14. An elastomeric centrifugal thrust bearing is provided at the inboard most pitch change or feathering bearing, and also positioned along the longitudinal axis of the blade grip.

Figure 3:
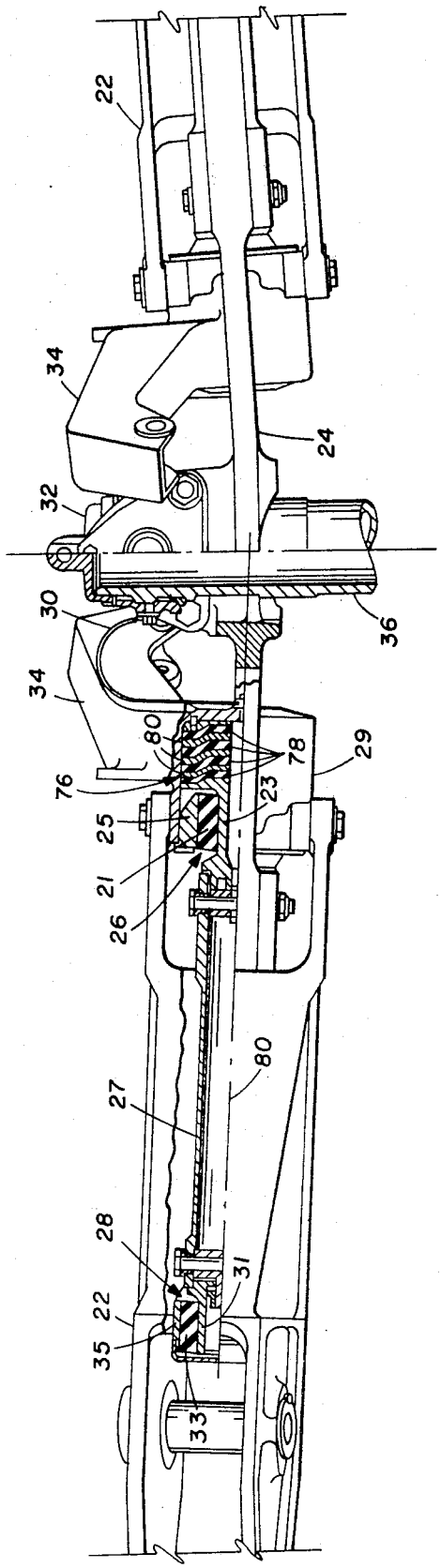
FIG. 3 is a side view of the concentric tube spring coupling of the assembly of FIG. 2.
Figure 2:
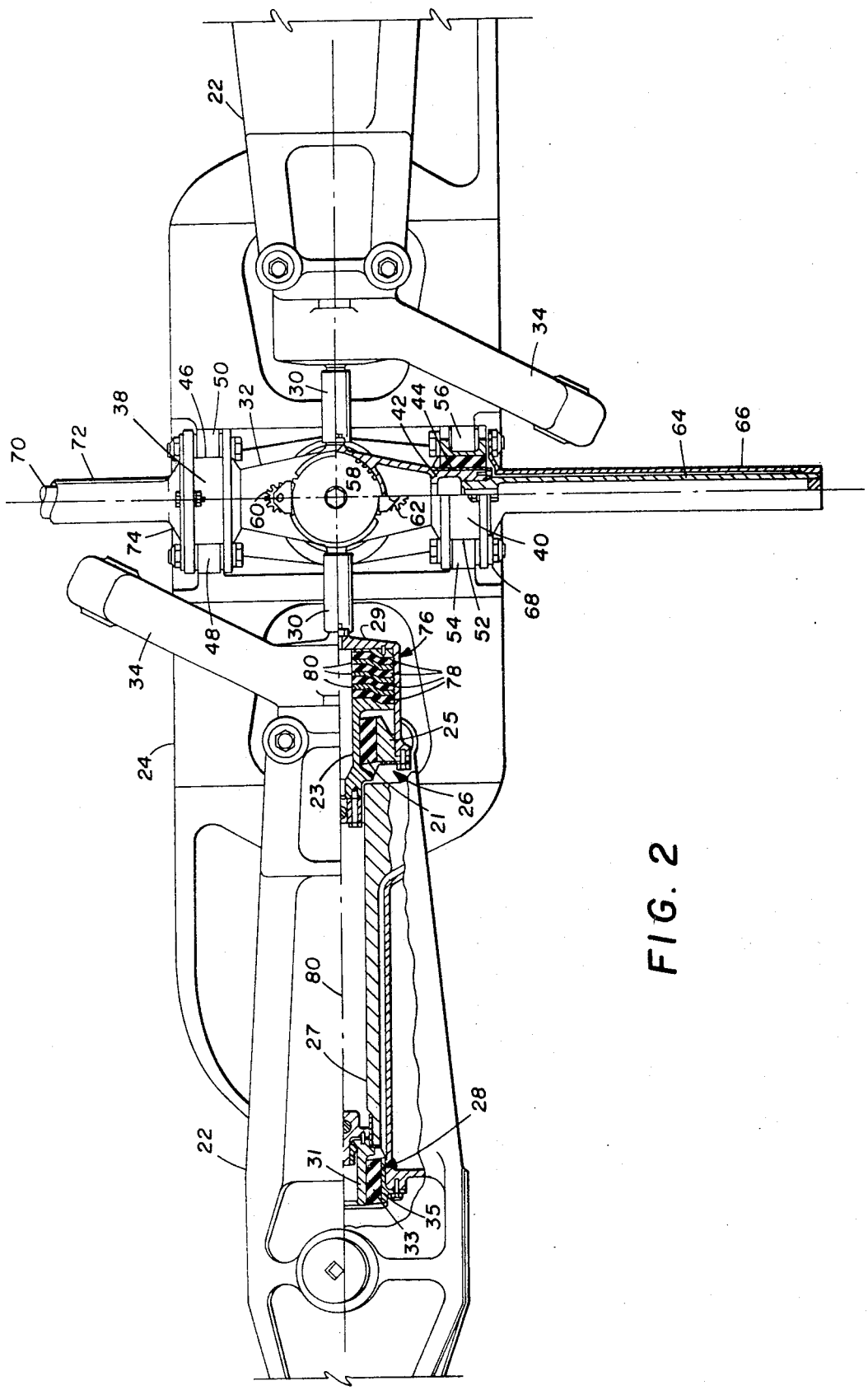
FIG. 2 is a plan view of a concentric tube spring coupling between a rotating support mast and a rotor yoke for a two blade assembly.

Referring to FIGS. 2 and 3, the rotor blades 20 (not shown in FIGS. 2 and 3) are mounted to blade grips 22 at the outboard end thereof. Each of the blade grips 22 is coupled to a yoke 24 by means of an inboard elastomeric pitch or feathering bearing 26 and a similar outboard pitch or feathering bearing 28 both mounted on a center line coincident with the longitudinal axis 80 of the rotor yoke 24.

Specifically, the feathering bearing 26 includes an elastomeric element 21 adhesively secured to an inner race 23 and enclosed within a bearing housing 25. The inner race 23 is bolted or otherwise secured to a yoke shaft 27 as part of the yoke 24. The bearing housing 25 is fitted into a cylindrical casing 29 as part of a pitch arm 34. At the outboard end of the yoke shaft 27 there is secured an inner race 31 of the feathering bearing 28; secured to the inner race 31 is an elastomeric element 33 enclosed within an outer race 35. This outer race is fit into an opening of the blade grip 22.

In addition to the feathering bearings 26 and 28, a laminated, elastomeric, centrifugal thrust bearing 76 is provided for coupling the blade grips 22 to the rotor yoke 24. As the name implies, the thrust bearing 76 provides a coupling for the radially directed thrust forces produced by rotation of the rotor blades 20 around the mast 36. The thrust bearing 76 comprises a series of elastomeric elements 78 interleaved with metallic elements 80 to form a laminated structure. The outboard most elastomeric element 78 is adhesively or otherwise attached to the inner race 23 of the feathering bearing 26. The innermost elastomeric element 78 is in engagement with the end wall of the cylindrical casing 29. As mounted, the center line of the bearing 76 falls on a line coincident with the longitudinal axis 80 of the rotor yoke 24.

A grounding strap 30 provides a current path between each of the blade grips 22 and a trunnion 32. For pitch control, each of the blade grips 22 includes the pitch arm 34 coupled to a pitch link (not shown) by means of a pitch arm clevis. In the usual manner, each of the pitch links are coupled to a swash plate for collective and cyclic pitch control of the rotor blade attached to a blade grip 22.

As explained, each of the blade grips is mounted to the rotor yoke 24 that is drivingly coupled to a rotating support mast 36. To enable a pilot to change the direction of tilt of the main rotor assembly 12 by means of pitch control of the blades 20, the yoke 24 is coupled to the support mast 36 by means of flapping bearings 38 and 40.

Opposite pivot shafts of the trunnion 32 support one of the elastomeric flapping bearings. The bearings 38 and 40 are constructed of an elastomeric material, such as a hard rubber or similar material. Overall construction of each of the bearings 38 and 40 provides a cylindrical configuration with an inner race 44 supported on a pivot shaft 42 and an outer elastomeric member mounted in a bearing cup bolted or otherwise secured to the yoke 24. The flapping bearing 38 is mounted in a baaring cup 46 that is bolted to saddle portions 48 and 50 formed as an integral part of the yoke 24. Similarly, the flapping bearing 40 is mounted in a bearing cup 52 bolted or otherwise secured to saddle portions 54 and 56 formed as an integral part of the yoke 24.

As illustrated in FIG. 2, the flapping bearings 38 and 40 are mounted to the yoke 24 at right angles to the longitudinal axis 80 of the yoke. To provide for lead-lag control of the rotor assembly, the trunnion 32 is mounted to the support mast 36 by means of a main gear 58 and spider gears 60 and 62.

To control the stability of the rotor assembly about the flapping bearings 38 and 40, two concentric tube springs are provided. Each of the springs couples to one of the pivot shafts of the trunnion 32 and is bolted along with the bearing cup to the saddle portions of the yoke 24. With reference to the concentric tube spring for the flapping bearing 40, an inner tube 64 is secured to an inner diameter of the pivot shaft 42 and locked in place to maintain a fixed relationship between the inner tube 64 and the pivot shaft 42. At the outboard end of the inner tube 64 it is joined with the outboard end of an outer tube 66 terminating at an inboard end in a flange 68 bolted to the saddle portions 54 and 56 along with the bearing cup 52. A similar arrangement is provided at the flapping bearing 38. An inner tube 70 is secured to the pivot shaft of the trunnion 32 and joins at its outboard end with the outboard end of an outer tube 72. The outer tube 72 terminates at the in board end in a flange 74 bolted to the saddle portions 48 and 50 with the bearing cup 46.

As the rotor assembly 12 tilts in its plane of rotation about the pivot shafts of the trunnion 32, a moment is generated at each of the concentric tube springs. This hub moment increases the control effect that is exerted by the tilt of the main rotor relative to the mast and displacement of the thrust vector from the center of gravity of the helicopter.

While only one embodiment of the invention, together with modifications thereof, has been described in detail herein and shown in the accompanying drawings, it will be evident that various further modifications are possible without departing from the scope of the invention.

What is claimed is:

1. A rotor blade mounting for a flapping main rotor, comprising in combination:
   a trunnion attached to a drive mast and having first and second pivot shafts extending from opposite ends thereof;
   a yoke having rotor blades attached thereto and rotatable therewith and having first and second bearing means positioned on said first and second pivot shafts to establish a flapping axis;
   a first spring including concentric tubes joined together at one end with the second end of one tube secured to the first pivot shaft and the seond end of the second tube secured to said yoke; and
   a second spring including concentric tubes joined together at one end with the second end of one tube secured to the second pivot shaft and the second end of the second tube secured to said yoke on the side opposite from said first spring.

2. A rotor blade mounting as set forth in claim 1 wherein said first and second springs extend axially from the respective first and second pivot shafts.

3. A rotor blade mounting for a flapping main rotor, comprising in combination:
   a trunnion attached to a drive mast;
   a yoke having each of the rotor blades attached thereto and rotatable therewith;
   means for resiliently coupling said trunnions to said yoke to transfer a rotating force from the mast to the main rotor;
   a first spring including concentric tubes joined together at one end with the second end of one tube secured to said trunnion and the second end of the second tube secured to said yoke on one side thereof; and
   a second spring axially aligned with the first spring and including concentric tubes joined together at one end with the second end of one tube secured to said trunnion and the second end of the second tube secured to said yoke on the side opposite from said first spring.

4. The rotor blade mounting as set forth in claim 1 wherein said first bearing means includes a flapping bearing on the first pivot shaft of said trunnion and attached to said yoke, and said second bearing means includes a flapping bearing on the second pivot shaft of said trunnion and attached to said yoke.

5. The rotor blade mounting as set forth in claim 4 wherein the first and second flapping bearings include cylindrical, elastomeric elements having an inner surface supported on the pivot shaft of said trunnion and an outer surface in a respective bearing support.

6. A rotor blade mounting for a flapping main rotor, comprising in combination:
   a trunnion attached to a drive mast and having first and second pivot shafts extending oppositely therefrom;
   a yoke having first and second bearing supports positioned along a flapping axis;
   bearing means on each of the pivot shafts of said trunnion and mounted to the bearing supports of said yoke;
   a blade grip for each of the rotor blades of the main rotor attached to and rotating with said yoke;
   bearing means for coupling each of said blade grips to said yoke;
   a first spring including concentric tubes joined together at one end with the second end of one tube secured to the first pivot shaft and the second end of the second tube secured to the first bearing support; and
   a second spring including concentric tubes joined together at one end with the second end of one tube secured to the second pivot shaft and the second end of the second tube secured to the second bearing support.

7. The rotor blade mounting as set forth in claim 6, wherein said first and second concentric tube springs and the first and second pivot shafts are axially aligned.

8. The rotor blade mounting as set forth in claim 6, wherein said bearing means for coupling each of said blade grips to said yoke includes an inboard and outboard feathering bearing and an inboard thrust bearing.

9. The rotor blade mounting as set forth in claim 8, wherein said feathering bearing and said thrust bearing comprise laminated elastomeric elements interleaved with metallic elements.

* * * * *